Oct. 25, 1955        J. A. NORTHCOTE        2,721,525

FRAME AND PLANTING ELEMENT ARRANGEMENT

Filed July 13, 1950        3 Sheets-Sheet 1

*INVENTOR.*
JOHN A. NORTHCOTE

BY

ATTORNEYS

Oct. 25, 1955        J. A. NORTHCOTE        2,721,525

FRAME AND PLANTING ELEMENT ARRANGEMENT

Filed July 13, 1950        3 Sheets-Sheet 2

INVENTOR.
JOHN A. NORTHCOTE
BY
ATTORNEYS

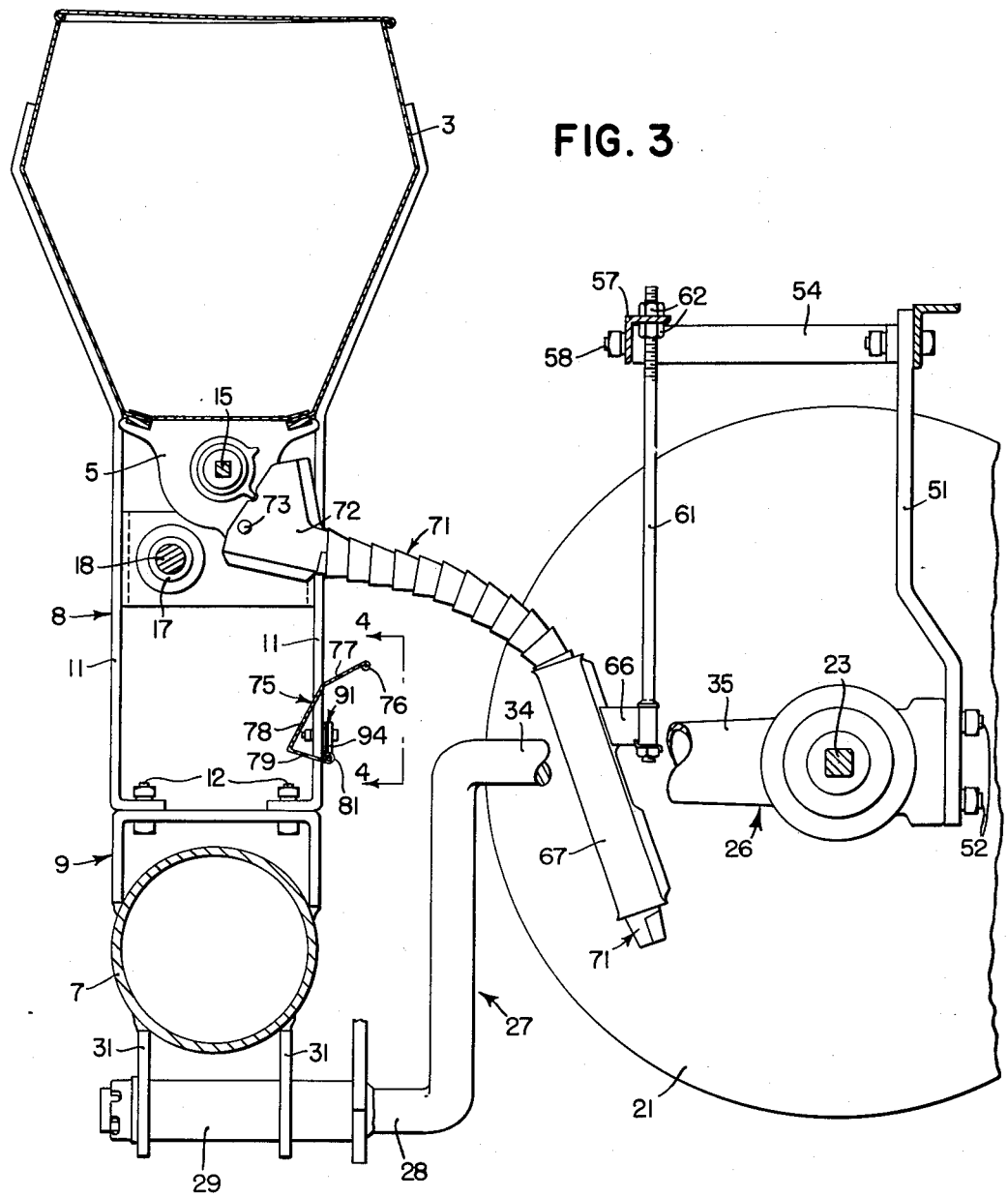

United States Patent Office 2,721,525
Patented Oct. 25, 1955

2,721,525

FRAME AND PLANTING ELEMENT ARRANGEMENT

John A. Northcote, Welland, Ontario, Canada, assignor to John Deere Plow Company (Limited), Welland, Ontario, Canada, a corporation of Canada Application July 13, 1950, Serial No. 173,586

4 Claims. (Cl. 111—52)

The present invention relates generally to agricultural implements and more particularly to seeding attachments and the like for ground-working machines.

The object and general nature of the present invention is the provision of a new and improved seeding attachment for a disk tiller or the like, and more particularly it is a feature of this invention to provide new and improved grain spouts and associated connections, including a lower seed tube spout connected to be moved vertically with the ground-engaging tool and an upper pivoted seed tube connection with the seeding unit of the attachment, the parts being so constructed and arranged that in their operating position the seed tubes are adapted to rest on a guard member pivotally connected with the disk tiller frame and lying over the adjustable links which form part of the mechanism movably connecting the soil-working units with the tiller frame. Further, it is a feature of this invention to provide guard means overlying the adjustable links, which guard means may be swung into an inoperative position to provide access to facilitate adjusting said links, in order to vary the position of the tool means relative to the tiller frame.

It is a further feature of this invention to provide a seed spout construction, substantially as characterized above, wherein the seed spouts are supported entirely out of contact with the guard members when the soil-working tool means are raised into their transport position, at which time the guard members may readily be raised to facilitate adjusting the linkage connecting the soil-working tools with the implement frame.

These and other objects and advantages of the present invention will be apparent to those skilled in the art after a consideration of the following detailed description, taken in conjunction with the accompanying drawings, in which:

Figure 3 is a fragmentary view similar to Figure 2, showing the positions of the several parts when the tool units are raised into a transport position.

Figure 1:
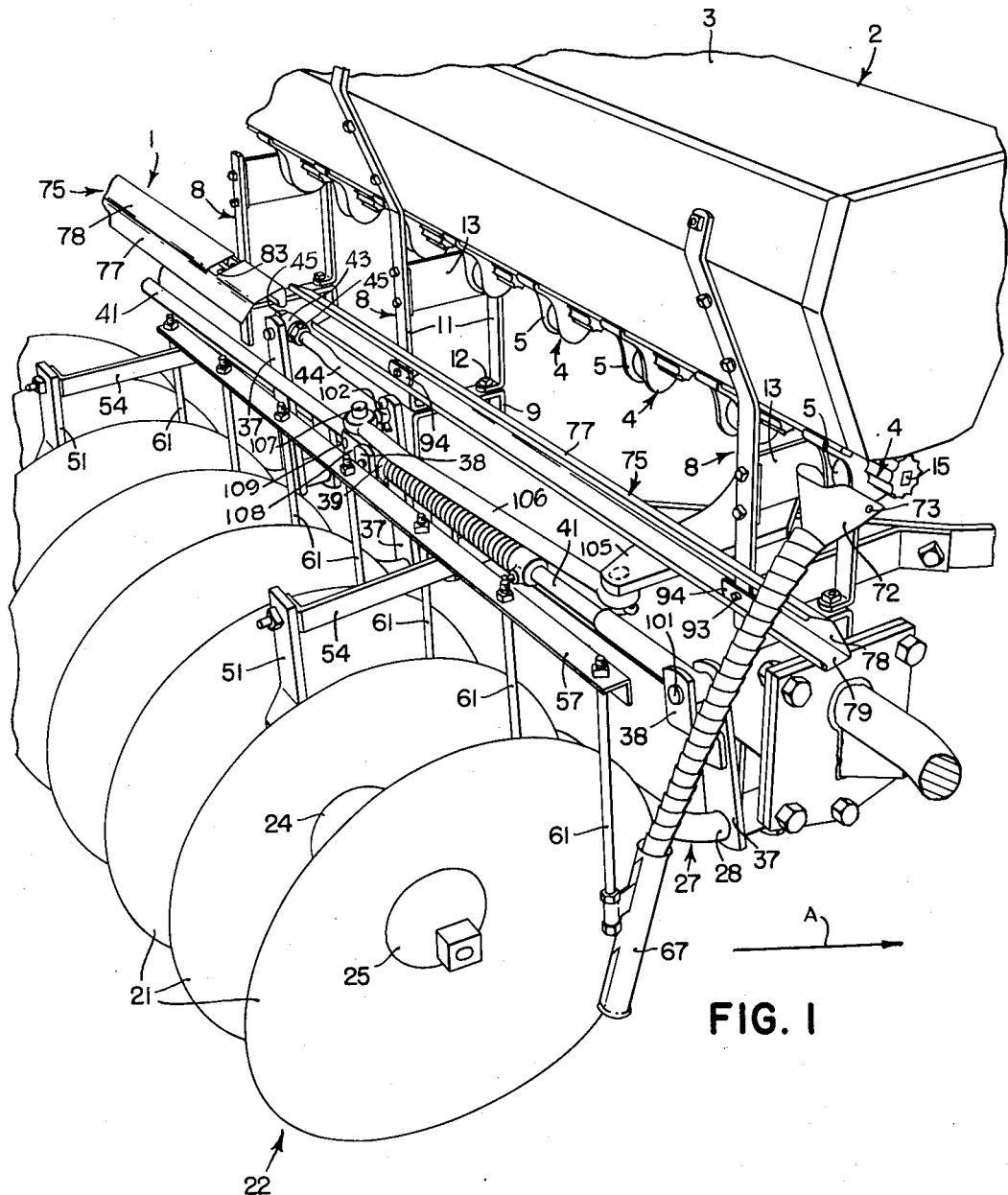
Figure 1 is a fragmentary perspective view of a seeding attachment particularly adapted to be mounted on a disk tiller and in which the principles of the present invention have been incorporated.

Referring now to the drawings, particularly Figure 1, the agricultural machine in which the principles of the present invention have been incorporated is shown as a disk tiller 1 on which a seeding attachment 2 is adapted to be mounted. The disk tiller 1 is substantially the same as the implement disclosed and claimed in the co-pending application, Serial No. 53,716, filed by Walter H. Silver et al., October 9, 1948. This application issued February 16, 1954, as U. S. Patent 2,669,171. The present invention is not especially concerned with the particular details of the seeding unit 2 except that the latter includes a seed hopper 3 carrying along its lower portion a plurality of seeding units 4, which are illustrated as of the fluted feed type, such as is shown in U. S. Patent 2,391,975, issued January 1, 1946. Each of the units 4 includes a seed cup 5, to which additional reference will be made below, and the seed box or hopper 3 is adapted to be supported on the frame member 7 of the disk tiller 1 by means of a plurality of supports 8, each of which includes a U-shaped part 9 having its ends extending downwardly and welded to the upper portion of the frame member 7, and a pair of vertically upwardly extending supports 11, the lower ends of which are turned laterally inwardly and secured, as by bolts 12, to the associated members 9. Plates 13 are bolted to the several pairs of supports 11, and the plates 13 support a seeding shaft 15 by which the fluted members of the seeding units 4 are actuated. Certain of the supporting plates 13 are provided with suitable bearings 17 which receive a drive shaft 18, and the latter is connected by any suitable means to drive the seeding shaft 15.

In addition to the frame member 7, the disk tiller 1 includes a plurality of gangs of disks 21. Each gang, indicated in its entirety by the reference numeral 22, includes, in addition to the disks 21, a gang bolt or shaft 23 on which the disks are mounted and a plurality of spacers 24 and washers 25, a construction that is generally conventional so far as disk implements are concerned. Each gang 22 also includes a pair of bearing members, one of which is indicated by the reference numeral 26 in Figures 2 and 3, and each bearing member is connected by a bail member 27 to the implement frame member 7. Each bail member 27 comprises a generally Z-shaped bar one portion 28 of which is rockably mounted in a bearing sleeve 29 fixed to the member 7 by a pair of apertured lugs 31 that are welded to the lower portion of the member 7. The other end section 34 of the bail member 27 is received by suitable journal means, not shown, within a sleeve section 35 forming a part of or connected with the gang bearing unit 26. Fastened to each section 28 of each of the bails 27 is a controlling arm 37. The rearmost arm 37 of each gang 22 carries a hammer strap 38, and the latter, together with the associated arm 37, is apertured to receive a swivel 39 through which a lifting rod 41, which connects with all of the rearmost arms of all of the gangs of the implement, extends and is slidable therein. The extreme right end of the rod 41 is also pivotally connected, as at 101, Figure 1, to the forward arm 37 of the forwardmost gang 22. Each rearward arm 37 extends upwardly above the swivel 39 and each forward arm 37 (except the forward arm 37 of the forwardmost gang 22) is also extended upwardly above the rod 41 a like amount. Each forward arm 37 (except the forward arm 37 of the forwardmost gang 22) is apertured to receive a swivel member 43 by which the rear end of a link member 44 is connected thereto, as by a pair of lock nuts 45 disposed on opposite sides of the associated swivel member 43, the link 44 being threaded for this purpose. The forward end of each link 44 is turned laterally, as at 102 (Figure 1), and is connected to the upper extended end of the adjacent rearward arm 37 of the next forward gang. Thus, each link 44 and associated parts serve to connect the arm 37 at the forward end of the associated disk gang to the adjacent arm on the rear bail of the adjacent forward gang, whereby the adjacent ends of the disk gangs are interconnected through the associated link 44, the latter being adjusted by means of the lock nuts 45 so that the desired relationship between adjacent ends of the gangs may be secured and retained. The rod 41 is actuated by any suitable means, such as a power or hand operated lever 105 to which the front or right end of an actuating bar 106 is pivotally connected. The rear end of the bar 106 is apertured and pivoted to a stud 107 that extends upwardly from a collar 108 disposed in rear of the swivel 39 and secured, as by a pin 109 or the like, to the front portion of the rod 41. There is a collar 108 behind each swivel 39 to transmit the movement of the rod 41 to the rear bail arms 37, and the links 44 transmit the movement from the rear arms 37 to the forward arm 37 on the rearwardly adjacent gang 22, as shown in Figure 1.

Figure 2:
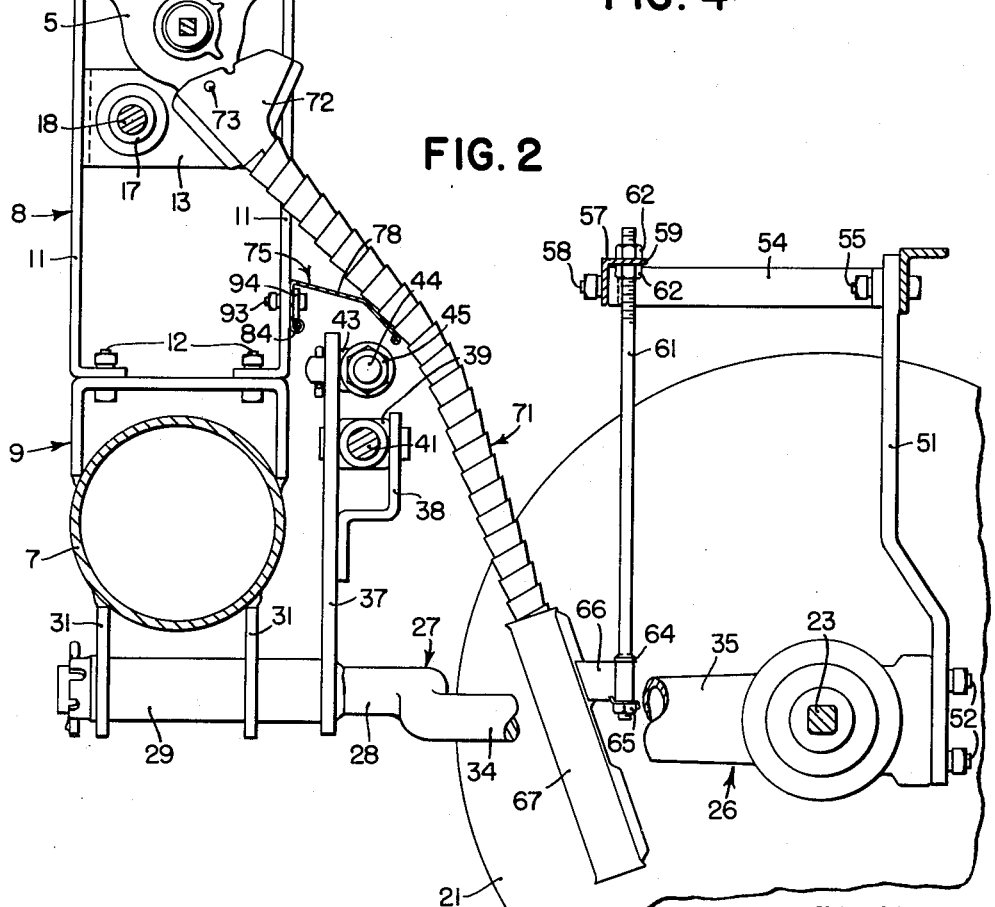
Figure 2 is a fragmentary generally transverse sectional view, showing the soil-working disks of the disk tiller in operating position, with the seed tubes supported on the link guard members.

Each gang 22 is provided with an upwardly extending bar 51 (Figure 2) which is secured to the associated bearing structure 26 by a pair of bolts 52, and secured rigidly to the upper end of each of the bars 51 is a forwardly extending bar 54 bolted, as at 55, at its rear end to the upper end of the associated bar 51, and at its forward end each of the horizontal bars 54 is bolted to a transverse seed tube supporting angle 57, as by a bolt 58. The upper horizontal flange 59 of the angle 57 is apertured to receive the upper threaded ends of a plurality of depending tube-spout-supporting rods 61. Each rod 61 is fixedly connected to the angle 57 by a pair of lock nuts 62. At its lower end, each of the rods 61 is upset, as at 64, and its lower end is threaded to receive a nut 65. Between the latter and the upset portion 64 each rod 61 receives the attaching bracket 66 of a generally cylindrical tube spout 67 which is thus fixedly supported on the associated frame 22. The implement in normal operation travels generally in the direction of the arrow A shown in Figure 1, and each of the tube spouts 67 is supported in a downwardly and rearwardly extending position, as shown in Figure 2, each tube spout being generally of constant cross section. Telescopically associated with each tube spout 67 is the lower end of a seed tube 71, the upper end of which is suitably fixed to an upper tube spout 72. Each of the upper tube spouts 72 is supported on the associated seed cup 5 by pivot studs or pins 73, the latter serving to establish a pivot axis extending generally transversely of the seed cup associated therewith.

Figure 4:
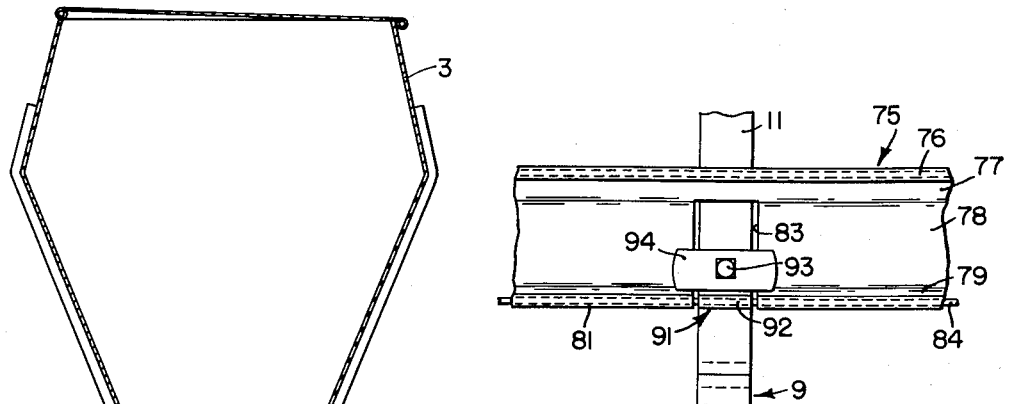
Figure 4 is a fragmentary view of the guard means in its raised position, affording access to the adjustable parts of the linkage connecting the tools with the tiller frame.

In order to prevent the seed tubes 71 from contacting the adjacent controlling and adjusting linkages 41 and 44, I provide an elongated tube guard plate member 75 (Figure 1), preferably one for each of the disk gangs 22. As best shown in Figures 2 and 3, in each of which the direction of forward travel is generally toward the left (see direction of travel as indicated in Figure 1), each of the seed tube guard plate members 75 includes a sheet metal section having a roll 76 at its rear or outer edge, two angularly related sheet sections 77 and 78, and a front or inner section 79 preferably extending at right angles to the upper section 78. The lower edge of the section 79 is also provided with a reenforcing roll 81, and the latter, together with the sections 78 and 79, are slotted, as at 83, for a purpose which will be explained later. A hinge pin 84 extends through the rolled section 81, and for the purpose of pivotally mounting each tube guard 75 on the implement, I mount a bracket 91 on each of the rear seed box support bars 11. Each bracket 91 includes a rolled section 92 receiving the hinge pin 84 and a flat section which is bolted securely to the associated support 11 by means of a bolt 93, which bolt also extends through a transversely disposed stop bar 94, the length of which, as best shown in Figure 4, exceeds that of the associated slot or notch 83. The latter is formed in the tube guard so as to permit the seed tube guard to be swung upwardly and forwardly past the lower portion of the associated standard 11, into the position shown in Figure 3, whenever it is desired to gain access to the controlling and adjusting links 41 and 44. However, when the disk gangs are in their ground-working positions, as shown in Figure 2, the tube guards are swung downwardly until the sheet section 79 engages the forward face of each of the associated stop bars 94, which is the position shown in Figure 2. The tube guards 75 thus support the seed tubes 71 above the associated controlling and adjusting linkages so that any movement of the latter does not cause fouling or damage to the seed tubes. However, whenever the ground-working units 21 are raised into a transport position the lower end of each of the seed tubes slips downwardly within the associated seed tube spout 67, best shown in Figure 3, and at the same time the upper tube spouts 72 pivot on the pins 73, whereby the seed tubes 71 are supported, without undue bending or kinking, entirely independently of the seed tube guard plates 75, thereby providing for any upward swinging of the latter, if necessary. The pivoting of the upper tube spouts 72 permits the telescoping of the lower portions of the seed tubes within the associated lower tube spouts 67.

While I have shown and described above the preferred structure in which the principles of the present invention have been incorporated, it is to be understood that my invention is not to be limited to the particular means shown and described above, but that, in fact, widely different means may be employed in the practice of the broader aspects of my invention.

What I claim, therefore, and desire to secure by Letters Patent is:

1. The combination with an agricultural machine having a frame, ground-engaging tool means connected with said frame for generally vertical movement relative thereto, and means including generally horizontally disposed links movable along said frame and connected with said tool means for raising and lowering the latter relative to said frame, of a seeding attachment having a plurality of seeding units mounted on said frame, a plurality of seed spouts connected with said tool means to move generally vertically therewith and disposed below the level of said links when the tool means are lowered and disposed above the level of said links when said tool means are raised, and a flexible seed tube extending from each seeding unit downwardly to the associated seed spout on said tool means, the upper portion of said flexible seed tube being pivotally connected with the associated seeding unit for movement about a generally horizontal axis and the lower end of said seed tube being supported in the associated seed spout, and guard means supported on said frame above said links and positioned to receive and support the generally intermediate portion of each of said seed tubes when said tool means and the associated seed spouts are lowered, said guard means thereby preventing the seed tubes from coming into contact with said links when the latter are moved generally horizontally to raise and lower the associated tool means, said seed tubes being supported by their pivotal connections with said frame and their connection with the respective seed spouts above and out of contact with said guard means when said tool means are raised.

2. The combination set forth in claim 1, further characterized by means pivotally connecting said guard means with said frame whereby the guard means may be raised, when the tool means and seed tubes are raised, to provide for access to said links from points above the latter.

3. The combination set forth in claim 1, further characterized by vertical brackets on said frame serving to support said seeding units, and means pivotally supporting said guard means on said brackets in a position above said links, whereby the guard means may be raised, when the tool means and seed tubes are raised, to provide for access to said links from points above the latter.

4. The combination set forth in claim 3, further characterized by said guard means having slotted portions spaced to embrace said brackets when the guard means are raised, and transverse stops carried by said brackets in a position crossing the slots in said slotted portions, thereby cooperating with the latter in holding the guard means above said links and acting through said guard means to support the generally intermediate portions of said seed tubes when said tool means are lowered.

(References on following page)

References Cited in the file of this patent

UNITED STATES PATENTS

| | | |
|---|---|---|
| 351,843 | Shelton | Nov. 2, 1886 |
| 488,846 | Snell et al. | Dec. 27, 1892 |
| 641,718 | Miller | Jan. 23, 1900 |
| 768,656 | Danielsen | Aug. 30, 1904 |
| 835,810 | Collins | Nov. 13, 1906 |
| 964,761 | Davis | July 19, 1910 |
| 1,006,771 | Metzler | Oct. 24, 1911 |
| 1,339,766 | Karle | May 11, 1920 |
| 1,600,215 | Clarkson | Sept. 21, 1926 |
| 1,869,820 | McKay et al. | Aug. 2, 1932 |
| 1,905,892 | Botsford | Apr. 25, 1933 |
| 2,042,133 | Underwood | May 26, 1936 |
| 2,155,443 | Parks et al. | Apr. 25, 1939 |
| 2,164,639 | Brower | July 4, 1939 |
| 2,245,374 | White | June 10, 1941 |
| 2,648,270 | Silver et al. | Aug. 11, 1953 |

FOREIGN PATENTS

| | | |
|---|---|---|
| 29,967 | Great Britain | 1912 |
| 114,302 | Australia | Nov. 25, 1941 |
| 378,173 | France | Aug. 1, 1907 |
| 459,904 | Canada | Sept. 27, 1949 |
| 623,145 | Great Britain | May 12, 1949 |